United States Patent
Kurokawa

(10) Patent No.: US 9,045,165 B2
(45) Date of Patent: Jun. 2, 2015

(54) VEHICLE SIDE PORTION JOINING PORTION STRUCTURE

(75) Inventor: Hiroyuki Kurokawa, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 157 days.

(21) Appl. No.: 13/260,056

(22) PCT Filed: Apr. 9, 2010

(86) PCT No.: PCT/JP2010/056440
§ 371 (c)(1),
(2), (4) Date: Sep. 23, 2011

(87) PCT Pub. No.: WO2011/125219
PCT Pub. Date: Oct. 13, 2011

(65) Prior Publication Data
US 2012/0098297 A1    Apr. 26, 2012

(51) Int. Cl.
*B62D 25/04* (2006.01)
*B62D 25/02* (2006.01)

(52) U.S. Cl.
CPC .............. *B62D 25/04* (2013.01); *B62D 25/02* (2013.01); *B62D 25/025* (2013.01)

(58) Field of Classification Search
CPC ....... B62D 25/02; B62D 25/025; B62D 25/04
USPC ....................................... 296/193.05, 193.06
See application file for complete search history.

(56) References Cited

U.S. PATENT DOCUMENTS

| 4,471,992 A | 9/1984 | Matsuura et al. |
| 4,726,166 A | 2/1988 | DeRees |

FOREIGN PATENT DOCUMENTS

| JP | 58-063168 U | 4/1983 |
| JP | 62-132870 U | 8/1987 |
| JP | 62-214063 A | 9/1987 |
| JP | 64-18980 U | 1/1989 |
| JP | 4-143174 A | 5/1992 |
| JP | 4-215574 A | 8/1992 |
| JP | 5-155358 A | 6/1993 |
| JP | 5-049515 B | 7/1993 |
| JP | 6-263062 A | 9/1994 |

(Continued)

OTHER PUBLICATIONS

International Search Report mailed Jul. 13, 2010 of PCT/JP2010/056440.

(Continued)

*Primary Examiner* — Glenn Dayoan
*Assistant Examiner* — Melissa A Black
(74) *Attorney, Agent, or Firm* — Kenyon & Kenyon LLP

(57) ABSTRACT

There is provided a vehicle side portion joining portion structure capable of promoting a reduction in weight of a vehicle body and of effectively suppressing vibrations and deformations of a pillar, regardless of structures of the pillar and a rocker and the like. A pillar reinforcement member is joined to an interior of a foot portion of a pillar outer that is formed with an open cross section in which a vehicle width direction inner side is opened. At a vehicle forward side of the foot portion, a front side closed cross section is formed at a vehicle front side portion of the foot portion. At a vehicle rearward side of the foot portion, a rear side closed cross section is formed at a vehicle rear side portion of the foot portion.

5 Claims, 7 Drawing Sheets

(56) References Cited

FOREIGN PATENT DOCUMENTS

| | | | |
|---|---|---|---|
| JP | 8-002438 A | | 1/1996 |
| JP | 2003-127899 A | | 5/2003 |
| JP | 2003-252237 A | | 9/2003 |
| JP | 2004314761 A | * | 11/2004 |
| JP | 2010-254187 A | | 11/2010 |
| JP | 2011-194945 A | | 10/2011 |

OTHER PUBLICATIONS

Technology Described in Technological Disclosure No. 2009-501240 of the Japan Institute of Invention and Innovation, Mar. 2, 2009, Toyota Jidosha Kabushiki Kaisha, Inventor: Hideo Takeda.

Office Action issued Jul. 3, 2012 in JP 2011-501048 and English translation thereof.

* cited by examiner

VEHICLE SIDE PORTION JOINING PORTION STRUCTURE

This is a 371 national phase application of PCT/JP2010/056440 filed Apr. 9, 2010, the contents of which are incorporated herein by reference.

TECHNICAL FIELD

The present invention relates to a joining portion structure of a vehicle side portion, and particularly relates to a vehicle side portion joining portion structure that provides reinforcement to a joining portion between a pillar and a rocker.

BACKGROUND ART

With a view to reducing weight and reducing costs of the body of an automobile, reducing of a plate thickness of a steel plate, which employs a super high tension steel and hot pressing, and opening of a cross section of a pillar, which employs an integrated reinforcement structure in which the pillar and a rocker are integrated, an innerless structure in which a pillar inner is not provided in the pillar, and the like are applied to side member skeleton members such as a pillar, a rocker and the like. When these are applied, the vehicle body tends to be disadvantaged in respect of vehicle body rigidity, vehicle body vibrations, local impact strength and the like. Therefore, some countermeasure is necessary for the vehicle body.

A structure at a region of connection between a pillar and a rocker is, for example, the structure disclosed in Japanese Patent Application Laid-Open (JP-A) No. 2003-127899.

DISCLOSURE OF THE INVENTION

Problems to be Solved by the Invention

To suppress deformations in which a pillar collapses in a vehicle body front or rear direction or in a vehicle body inner or outer width direction, a particularly important requirement is to suppress deformations of a foot portion of a pillar that is connected to a rocker portion that is connected to a platform of a base.

In the structure disclosed in JP-A No. 2003-127899, a rocker is reinforced by a reinforcement, but this is not a structure that suppresses deformation of the foot portion of the pillar. Thus, there is room for improvement in regard to suppressing vibrations and deformation of the pillar.

In consideration of the circumstances described above, an object of the present invention is to provide a vehicle side portion joining portion structure that is capable of effectively suppressing vibrations and deformation of a pillar, regardless of structures of the pillar and a rocker and the like.

Means for Solving the Problems

Because of external forces from tires during running, vibrations and the like, a pillar is subject to microscopic deformations in the manner of collapsing in a vehicle body front or rear direction or in a vehicle body inner or outer width direction.

As a result of a number of experimental studies by the inventors, it has become clear that what is particularly important is a joining portion between a pillar skeleton and a rocker portion connected to a platform that is a base, and that vehicle body stiffness, vibrations and the like may be effectively improved by reinforcing this joining portion.

Deformations of the pillar in the manner of collapsing in the vehicle body front or rear direction or in the vehicle body inner or outer width direction, due to external forces from tires, vibrations and the like, are greatly promoted by the cross section of a curved portion of a foot portion, at which the pillar is joined to a rocker, crushing and deforming. In other words, it is clear that deformations of the pillar in the manner of collapsing in the vehicle body front or rear direction or in the vehicle body inner or outer width direction may be greatly moderated by suppressing crushing of the cross section of the curved portion of the foot portion that is the root of the pillar, at which the pillar is joined to the rocker.

If an opened cross section structure based on an integrated reinforcement structure, an innerless structure or the like is applied to a portion of the pillar and the rocker, there is no rocker top wall inside the pillar joining portion, and there is no restraining force on an outer face of the pillar. Therefore, rotary deformations of the pillar root portion about a front-rear axis of the rocker (deformations to collapse in the vehicle body inner or outer width direction), cross-sectional deformations and twisting deformations occur more easily. Therefore, appropriate countermeasures are necessary.

With regard to a side impact, if an opened cross section structure based on an integrated reinforcement structure, an innerless structure or the like is applied, there is no rocker top wall inside the pillar joining portion, and an input force from an impacting vehicle may not be transmitted to the platform that is the base. Therefore, an amount of deformation of the pillar is large and an amount by which the pillar enters into the vehicle cabin is increased. As a countermeasure to this, a member is required that corresponds to a rocker upper wall in the pillar joining portion, being capable of transmitting input force from an impacting vehicle to the platform that is the base.

A vehicle side portion joining portion structure relating to a first aspect of the present invention is made in consideration of the situation described above and includes: a rocker configured to include a rocker outer that is disposed at a lower side of a vehicle side portion and extends in a vehicle front-rear direction and a rocker inner that is disposed at a vehicle width direction inner side of the rocker outer and extends in the vehicle front-rear direction; a pillar configured to include at least a pillar outer that extends upward at a vehicle body from the rocker outer, the pillar outer including a vehicle width direction outer side wall face, a vehicle forward side wall face that extends to the vehicle width direction inner side from a vehicle front side end portion of the vehicle width direction outer side wall face, and a vehicle rearward side wall face that extends to the vehicle width direction inner side from a vehicle rear side end portion of the vehicle width direction outer side wall face, and the pillar including, at the rocker side thereof, a foot portion at which the vehicle forward side wall face and the vehicle rearward side wall face curve such that a dimension of the pillar in the vehicle front-rear direction gradually increases toward the rocker; and a pillar reinforcement member that is provided at the foot portion and is configured to include a first front side dividing wall that extends to the vehicle width direction inner side from the vehicle width direction outer side wall face and is disposed to form a gap at a vehicle rearward side of the vehicle forward side wall face, a second front side dividing wall that connects a vehicle width direction inner side end portion of the first front side dividing wall with a vehicle width direction inner side end portion of the vehicle forward side wall face, a first rear side dividing wall that extends to the vehicle width direction inner side from the vehicle width direction outer side wall face and is disposed to form a gap at a vehicle forward side of the vehicle rearward side wall face, a second rear side dividing wall that connects a vehicle width direction inner side end portion of the first rear side dividing wall with a vehicle width direction inner side end portion of the vehicle rearward side wall face, and a lower side connection dividing wall that connects a lower side end portion of the first front side dividing wall with a lower side end portion of the first rear side dividing wall and that connects the vehicle width direction outer side wall face with the rocker, wherein, at the foot portion, a front side closed cross section is formed in a cross section at the vehicle forward side by the vehicle width direction outer side wall face, the first front side dividing wall, the second front side dividing wall and the vehicle forward side wall face, and a rear side closed cross section is formed in a cross section at the vehicle rearward side by the vehicle width direction outer side wall face, the first rear side dividing wall, the second rear side dividing wall and the vehicle rearward side wall face.

Next, operation of the vehicle side portion joining portion structure relating to the first aspect is described.

According to the vehicle side portion joining portion structure relating to the first aspect, in the cross section of the foot portion of the pillar outer, a closed cross section face is formed at a vehicle forward side region by a total of four faces—the vehicle width direction outer side wall face, the first front side dividing wall, the second front side dividing wall and the vehicle forward side wall face—and a closed cross section face is formed at a vehicle rearward side region by a total of four faces—the vehicle width direction outer side wall face, the first rear side dividing wall, the second rear side dividing wall and the vehicle rearward side wall face. Thus, cross-sectional crushing of the vicinity of a portion of contact between the pillar outer and the rocker when an external force acts on the pillar outer, that is, the foot portion of the pillar outer that is curved in side view, may be suppressed.

Thus, deformations of the pillar collapsing in the vehicle body front or rear direction or in the vehicle body inner or outer width direction, and vibrations and the like, may be effectively suppressed.

Furthermore, in a cross section of the foot portion, the region in which the closed cross sections are formed at the vehicle forward side and the vehicle rearward side is substantially triangular in a side view of the vehicle. Therefore, deformation of the foot portion may be efficiently suppressed.

A vehicle side portion joining portion structure relating to a second aspect of the present invention is the vehicle side portion joining portion structure relating to the first aspect, in which the pillar reinforcement member includes a vehicle width direction outer side connecting wall that connects a vehicle width direction outer side end portion of the first front side dividing wall, a vehicle width direction outer side end portion of the first rear side dividing wall and a vehicle width direction outer side end portion of the lower side connection dividing wall with one another, and that is connected with the vehicle width direction outer side wall face.

Next, operation of the vehicle side portion joining portion structure relating to the second aspect is described.

According to the vehicle side portion joining portion structure relating to the second aspect, when there is, for example, a side impact, a side impact load is inputted through the vehicle width direction outer side wall face of the pillar outer. The side impact load is taken up over a wide area by the vehicle width direction outer side connecting wall of the pillar reinforcement member. Therefore, the side impact load may be efficiently transmitted through the rocker inner to the platform while being supported by the first front side dividing wall and the first rear side dividing wall, and also by the second front side dividing wall and the second rear side dividing wall.

A vehicle side portion joining portion structure relating to a third aspect of the present invention is the vehicle side portion joining portion structure relating to the second aspect, in which a door hinge attachment portion for attaching a door hinge is provided at the vehicle width direction outer side connecting wall, and a bead connecting the first front side dividing wall with the first rear side dividing wall is provided at the vehicle width direction outer side connecting wall, at at least one of a vehicle upward side and a vehicle downward side of the door hinge attachment portion.

Next, operation of the vehicle side portion joining portion structure relating to the third aspect is described.

According to the vehicle side portion joining portion structure relating to the third aspect, the bead connecting the first front side dividing wall and the first rear side dividing wall is provided at one or both of the vehicle upward side and the vehicle downward side of the door hinge retaining portion. Therefore, a door hinge attachment portion with a high attachment strength is provided. Furthermore, a force acting on the door hinge attachment portion may be efficiently transmitted to the first front side dividing wall and the first rear side dividing wall via the bead(s) with high stiffness.

A vehicle side portion joining portion structure relating to a fourth aspect of the present invention is the vehicle side portion joining portion structure relating to any one of the first to third aspects, in which the rocker outer and the pillar outer are integrally formed.

Next, operation of the vehicle side portion joining portion structure relating to the fourth aspect is described.

According to the vehicle side portion joining portion structure relating to the fourth aspect, the rocker outer and the pillar outer are integrated. Thus, higher strength is provided, while weight is reduced, compared to when a rocker outer and pillar outer are formed as respectively separate components and the rocker outer and pillar outer are joined by welding or the like, and manufacturing characteristics are good.

A vehicle side portion joining portion structure relating to a fifth aspect of the present invention is the vehicle side portion joining portion structure relating to any one of the first to third aspects, in which the pillar is an open cross section structure in which a vehicle width direction inner side of the pillar outer is opened.

Next, operation of the vehicle side portion joining portion structure relating to the fifth aspect is described.

According to the vehicle side portion joining portion structure relating to the fifth aspect, the pillar has an open cross section structure in which the vehicle width direction inner side of the pillar outer is opened. Thus, because what is known as a pillar inner is not provided, a reduction in weight of the vehicle compared to when a pillar inner is provided is promoted.

Here, because the pillar reinforcement member suppresses cross-sectional crushing of the foot portion of the pillar outer, even though the pillar is not equipped with a pillar inner, deformations of the pillar collapsing in the vehicle body front or rear direction or in the vehicle body inner or outer width direction, and vibrations and the like, may be effectively suppressed.

A vehicle side portion joining portion structure relating to a sixth aspect of the present invention is the vehicle side portion joining portion structure relating to the fifth aspect, in which sealing members are provided that close a gap between an end portion of the pillar reinforcement member and the pillar outer and a gap between the end portion of the pillar reinforcement member and the rocker inner.

Next, operation of the vehicle side portion joining portion structure relating to the sixth aspect is described.

If, for example, the pillar reinforcement member and the pillar outer are spot-welded, the pillar reinforcement member and pillar outer are not completely in close contact between neighboring points of the spot welding, and there may be microscopic gaps. Similarly, if the pillar reinforcement member and the rocker inner are spot-welded, the pillar reinforcement member and rocker inner are not completely in close contact between neighboring points of the spot welding, and there may be microscopic gaps.

According to the vehicle side portion joining portion structure relating to the sixth aspect, the gap between the end portion of the pillar reinforcement member and the pillar outer and the gap between the end portion of the pillar reinforcement member and the rocker inner are closed off by the sealing members. Therefore, even with the open cross section structure in which the pillar is not provided with a pillar inner, ingressions of water, dust, sound and the like from inside the rocker through the pillar outer into the cabin may be prevented.

Effects of the Invention

According to the vehicle side portion joining portion structure relating to the first aspect of the present invention as described above, there is an excellent effect in that vibrations, deformations and the like of the pillar may be effectively suppressed regardless of structures of the pillar, the rocker and the like.

According to the vehicle side portion joining portion structure relating to the second aspect of the present invention, a side impact load that is inputted through the vehicle width direction outer side wall face of the pillar outer may be taken up over a wide area by the vehicle width direction outer side connecting wall, and the side impact load may be efficiently transmitted to the platform.

According to the vehicle side portion joining portion structure relating to the third aspect of the present invention, strength of a door hinge attachment portion may be improved.

According to the vehicle side portion joining portion structure relating to the fourth aspect of the present invention, higher strength is obtained while weight is reduced compared to when a rocker outer and a pillar outer are formed as respectively separate components and the rocker outer and pillar outer are joined by welding or the like, and manufacturing characteristics are improved.

According to the vehicle side portion joining portion structure relating to the fifth aspect of the present invention, because the pillar is not equipped with a pillar inner, a reduction in weight may be promoted.

According to the vehicle side portion joining portion structure relating to the sixth aspect of the present invention, ingressions of water, dust, sound and the like from inside the rocker into the cabin via the pillar outer may be prevented.

PREFERRED FORMS FOR EMBODYING THE INVENTION

First Exemplary Embodiment

Figure 1:
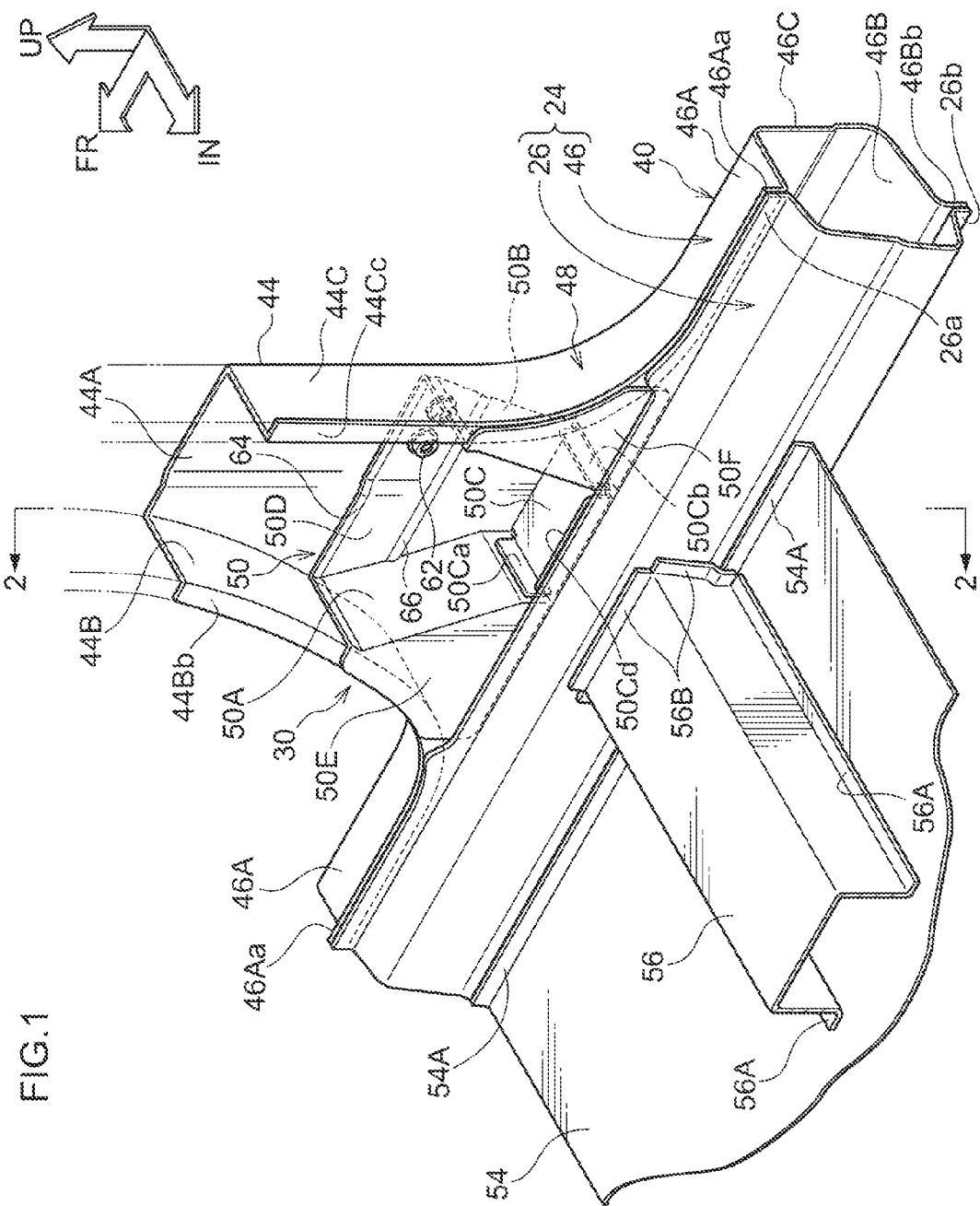
FIG. 1 is a perspective view of a vehicle side portion joining portion structure in which the present invention is employed.

Herebelow, the best embodiment of the vehicle side portion joining portion structure relating to the present invention is described. Herein, the arrow FR that is shown where appropriate in the drawings used hereafter represents a vehicle forward side, the arrow UP represents the vehicle upward side and the arrow IN represents the vehicle width direction inner side.

Figure 2:
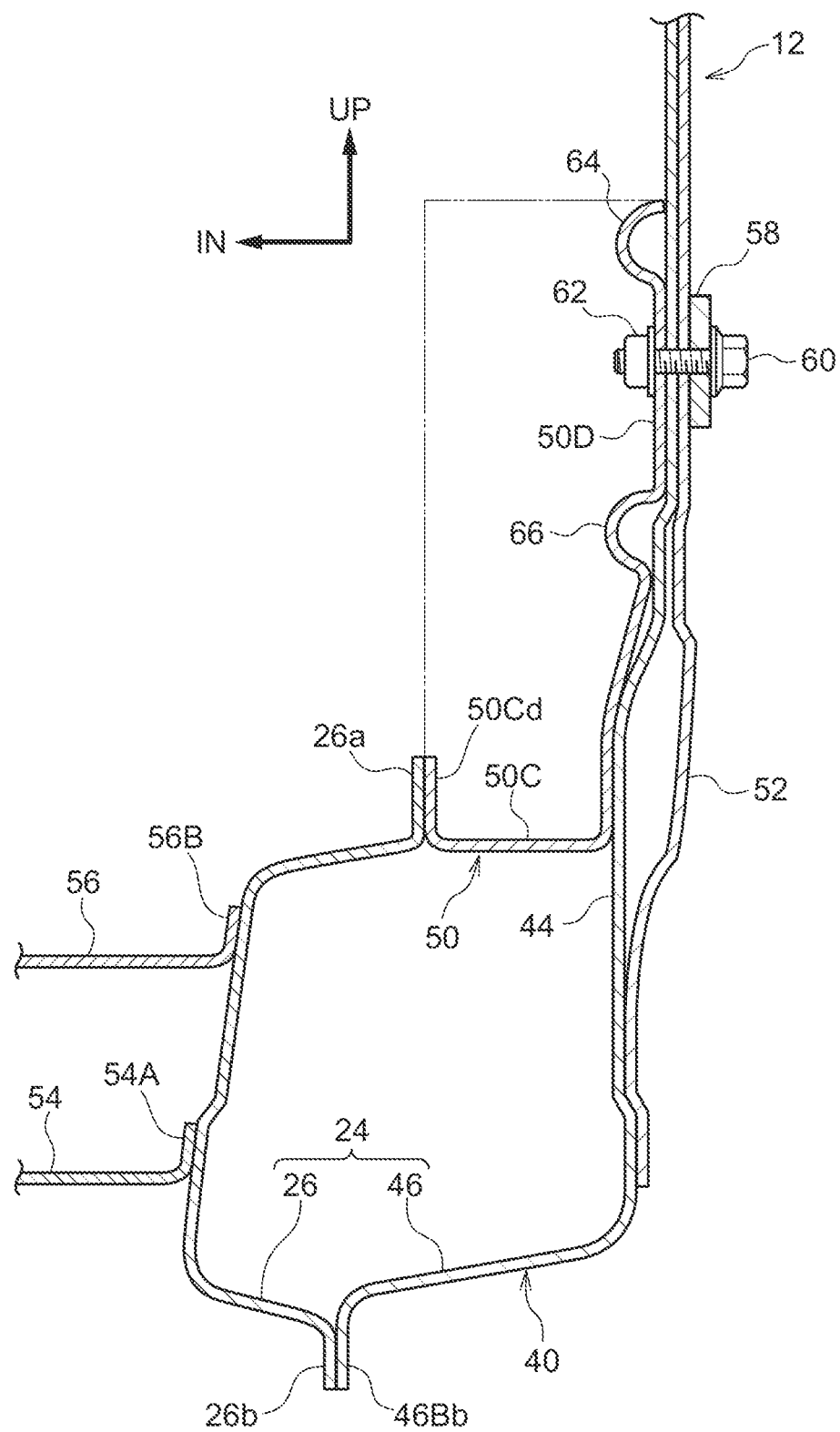
FIG. 2 is a vertical sectional view of a vehicle joining portion structure.
Figure 3:
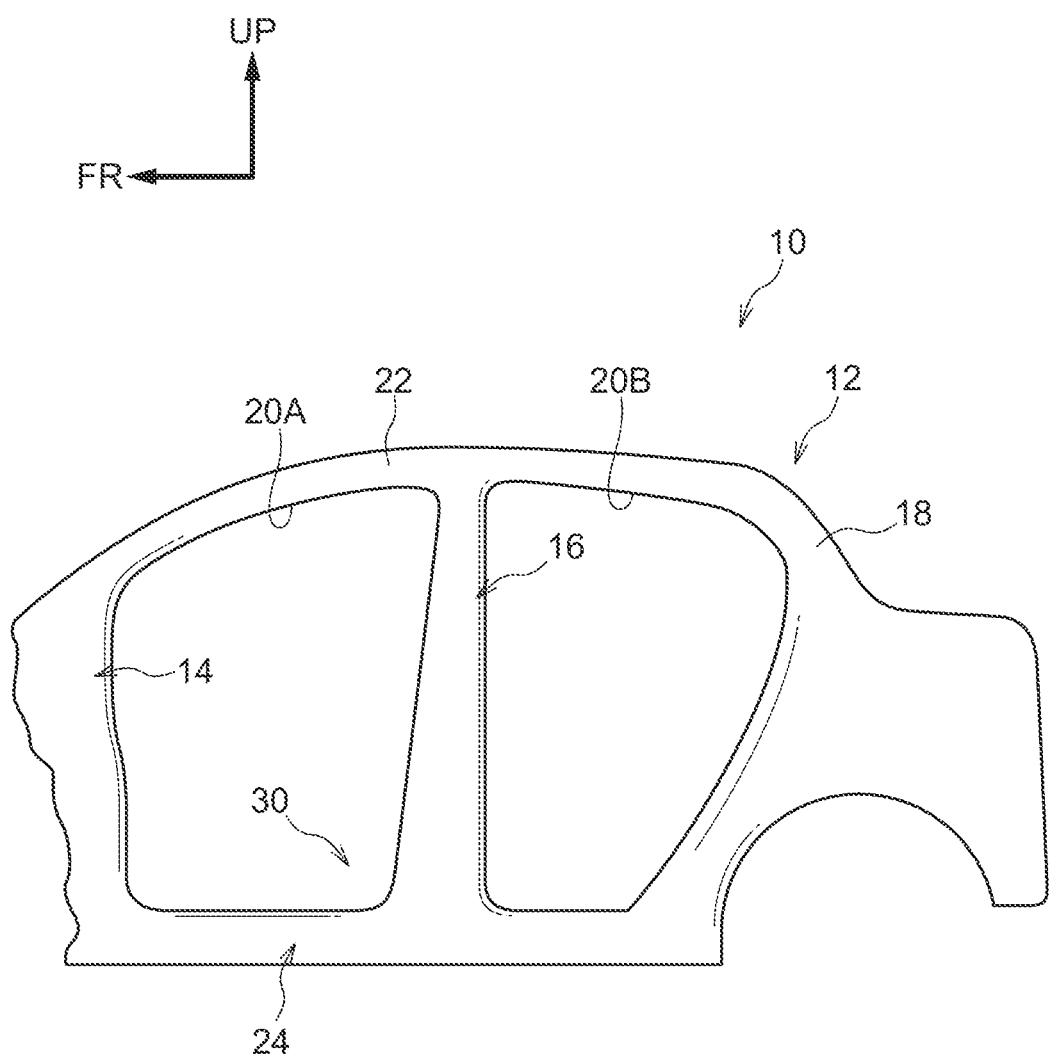
FIG. 3 is a side view of the vehicle.

FIG. 3 shows a portion of an automobile 10 (a vehicle), in which a vehicle body structure 30 of the present exemplary embodiment is employed, in a schematic side view. FIG. 1 shows a perspective view in which the vehicle body structure 30 is viewed from a vehicle cabin inner side, and FIG. 2 shows a vertical sectional diagram of the vehicle body structure 30.

As illustrated in FIG. 3, a front pillar 14 (an A pillar), a center pillar 16 (a B pillar) and a rear pillar 18 (a C pillar) are disposed at a vehicle side portion 12, in this order from the front side. The front pillar 14, the center pillar 16 and the rear pillar 18 are provided in left and right pairs. The center pillar 16 is disposed between a front door opening portion 20A and a rear door opening portion 20B that are formed in the vehicle side portion 12, and serves as a vehicle body skeleton member, a length direction of which is substantially in the vehicle up-down direction.

An upper end portion 16A of the center pillar 16 is joined to a vehicle front-rear direction middle portion of a roof side rail portion 22. The roof side rail portion 22 serves as a skeleton member that is disposed with a length direction thereof substantially in the vehicle front-rear direction, at both sides of the vehicle roof.

A lower end portion 16B of the center pillar 16 is joined to a vehicle front-rear direction middle portion of a rocker 24 (also referred to as "a side sill"). The rocker 24 serves as a skeleton member that is disposed with a length direction thereof substantially in the vehicle front-rear direction, at both sides of a vehicle body under portion.

—Structure of the Rocker—

As illustrated in FIG. 1 and FIG. 2, the rocker 24 is provided with a rocker inner panel 26.

The rocker inner panel 26 structures a vehicle width direction inner side portion of the rocker 24, is disposed at a lower end portion of the vehicle side portion 12 with a length direction thereof being in the vehicle front-rear direction, and has a hat-shaped cross section that opens outward in the vehicle width direction. An upper flange portion 26a is formed at an upper end side of the rocker inner panel 26, at the vehicle width direction outer end thereof, and a lower flange portion 26b is formed at a lower end side of the rocker inner panel 26, at the vehicle width direction outer end thereof.

—Outer Panel—

As illustrated in the sectional diagram of FIG. 2, an outer panel 40 (a side member outer panel reinforcement) is disposed at the vehicle width direction outer side of the rocker inner panel 26. A side member outer 52 is disposed further to the vehicle width direction outer side of the outer panel 40.

As illustrated in FIG. 1, the outer panel 40 of the present exemplary embodiment is integrally formed of a single steel plate that includes a rocker outer 46 and a pillar outer 44. The rocker outer 46 is disposed at the vehicle width direction outer side of the rocker inner panel 26 and extends in the vehicle front-rear direction. The pillar outer 44 extends upward in the vehicle from the vehicle upward side of the rocker outer 46.

As illustrated in FIG. 1, the rocker outer 46 is structured to include an upper wall 46A, a lower wall 46B, an outer side wall 46C, an upper flange portion 46Aa that is formed at a vehicle width direction inner end of the upper wall 46A, and a lower flange portion 46Bb that is formed at a vehicle width direction inner end of the lower wall 46B. Thus, apart from a portion that is joined with the pillar outer 44, the rocker outer 46 has a hat-shaped cross section that opens inward in the vehicle width direction.

The upper flange portion 46Aa and lower flange portion 46Bb of the rocker outer 46 are disposed with a common plane thereof being a plane whose planar directions include the vehicle up-down direction and the vehicle front-rear direction.

Of the rocker outer 46, the upper flange portion 46Aa is superposed with the vehicle width direction outer side of the upper flange portion 26a of the rocker inner panel 26 and joined thereto by spot welding, and the lower flange portion 46Bb is superposed with the vehicle width direction outer side of the lower flange portion 26b of the rocker inner panel 26 and joined thereto by spot welding.

Meanwhile, the pillar outer 44 of the outer panel 40 is provided with a vehicle width direction outer side wall face 44A, a vehicle forward side wall face 44B, a vehicle rearward side wall face 44C, a front flange portion 44Bb and a rear flange portion 44Cc. The vehicle width direction outer side wall face 44A is disposed with a length direction thereof substantially in the vehicle up-down direction, and has planar directions substantially along the vehicle front-rear direction and along the up-down direction. The vehicle forward side wall face 44B extends toward the vehicle width direction inner side from a vehicle front side end of the vehicle width direction outer side wall face 44A. The vehicle rearward side wall face 44C extends toward the vehicle width direction inner side from a vehicle rear side end of the vehicle width direction outer side wall face 44A. The front flange portion 44Bb extends to the vehicle forward side from a vehicle width direction inner end of the vehicle forward side wall face 44B. The rear flange portion 44Cc extends to the vehicle rearward side from a vehicle width direction inner end of the vehicle rearward side wall face 44C. Thus, a horizontal cross-sectional shape of the pillar outer 44 is substantially a hat shape that opens inward in the vehicle width direction.

Figure 4:
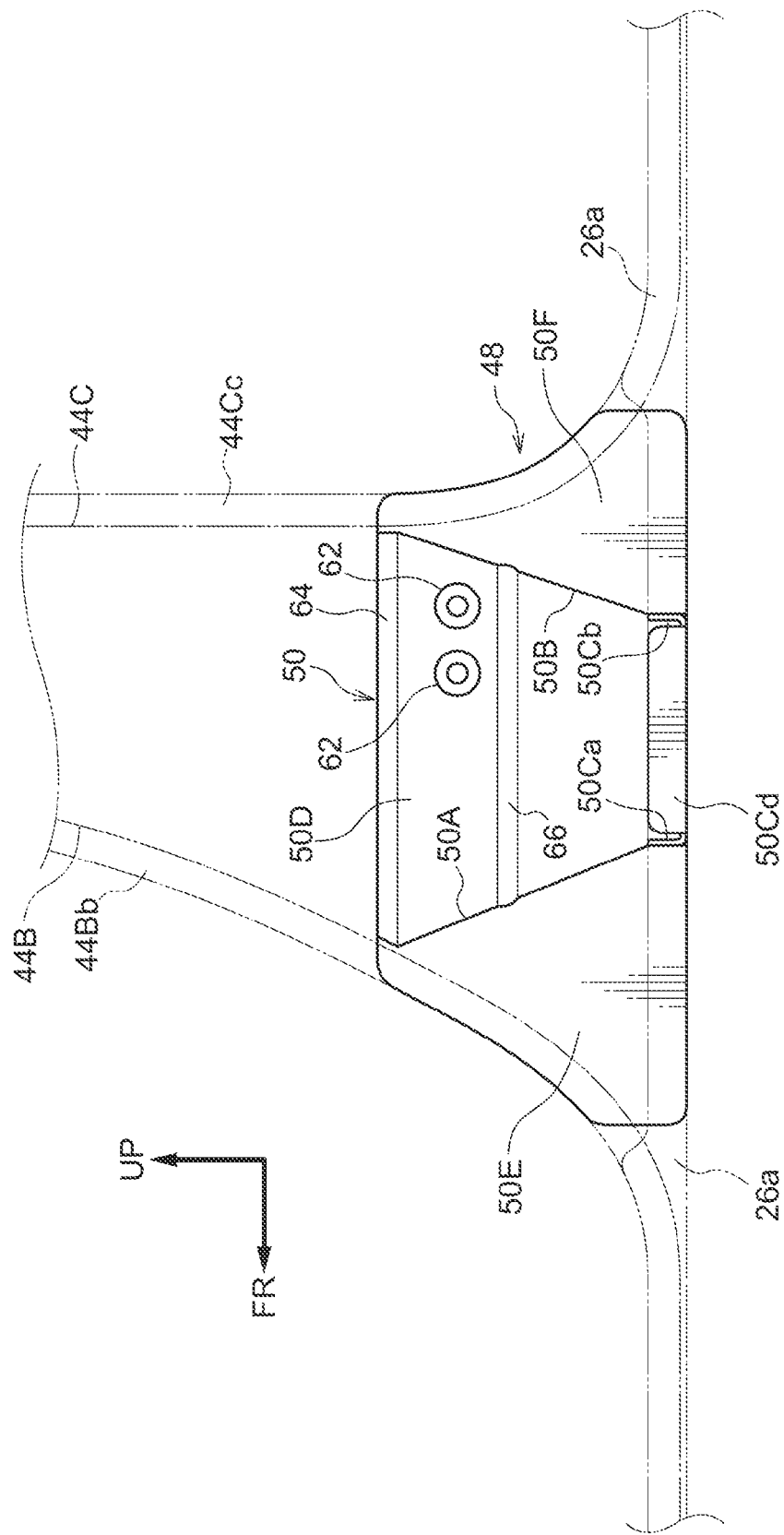
FIG. 4 is an elevation diagram of a pillar reinforcement member viewed from the vehicle inner side.

As illustrated in FIG. 1 and FIG. 4, a vehicle side view shape of the lower end side of the pillar outer 44, that is, a vicinity of the region of joining with the rocker outer 46, is a shape that gradually widens toward the rocker outer 46. Hereinafter, the region of the lower portion of the pillar outer 44 that gradually widens toward the rocker outer 46 is referred to as a foot portion 48.

At the foot portion 48, the vehicle forward side wall face 44B and the vehicle rearward side wall face 44C are curved such that orientations thereof both change from the vehicle up-down direction to the vehicle front-rear direction. A lower end side of the vehicle forward side wall face 44B is integrally joined to the upper wall 46A of the rocker outer 46 disposed at the vehicle front side of the pillar outer 44, and a lower end side of the vehicle rearward side wall face 44C is integrally joined to the upper wall 46A of the rocker outer 46 disposed at the vehicle rear side of the pillar outer 44.

In the rocker outer 46 of the present exemplary embodiment, the upper wall 46A is not provided at the region of joining with the pillar outer 44. Thus, a rocker interior space and pillar interior space are in communication with one another.

The front flange portion 44Bb of the pillar outer 44 is integrally connected to the upper flange portion 46Aa of the rocker outer 46 disposed at the vehicle front side of the pillar outer 44, and the rear flange portion 44Cc is integrally connected to the upper flange portion 46Aa of the rocker outer 46 disposed at the vehicle rear side of the pillar outer 44.

—Pillar Reinforcement Member—

A pillar reinforcement member 50 is disposed inside the foot portion 48 of the pillar outer 44. The pillar reinforcement member 50 is a bulkhead (dividing wall) of a type that is formed as a press-formed piece of steel plate.

The pillar reinforcement member 50 is formed in a dividing wall form so as to close off the interior of the pillar if viewed in a sectional view perpendicular to the length direction of the pillar. The pillar reinforcement member 50 is provided with a front side dividing wall 50A, a rear side dividing wall 50B, a lower side connection dividing wall 50C, a vehicle width direction outer side connecting wall 50D, a triangular front side dividing wall 50E and a triangular rear side dividing wall 50F.

Figure 5:
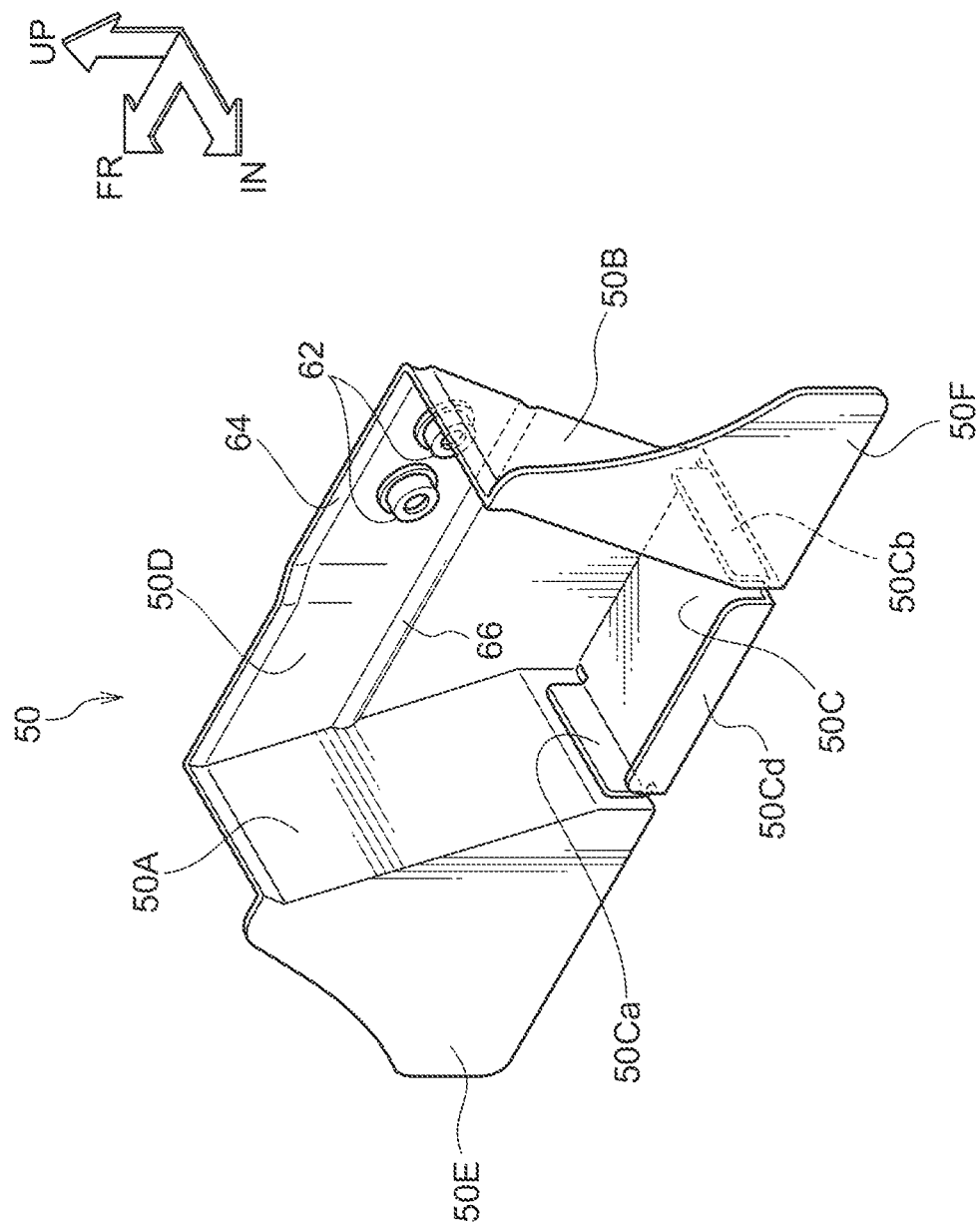
FIG. 5 is a perspective view of the pillar reinforcement member.

As illustrated in FIG. 1 and FIG. 5, the vehicle width direction outer side connecting wall 50D has an inverted trapezium shape when viewed in a vehicle side view (the length of a bottom edge is smaller than the length of a top edge), and is joined to the vehicle width direction inner side face of the vehicle width direction outer side wall face 44A of the foot portion 48 of the pillar outer 44 by spot welding. The front side dividing wall 50A is disposed at the vehicle forward side of the vehicle width direction outer side connecting wall 50D, and the rear side dividing wall 50B is disposed at the vehicle rearward side of the vehicle width direction outer side connecting wall 50D.

The front side dividing wall 50A extends orthogonally with respect to the vehicle width direction outer side connecting wall 50D, to the vehicle width direction inner side from an end portion at the vehicle forward side of the vehicle width direction outer side connecting wall 50D, and the front side dividing wall 50A is inclined such that, in a vehicle side view, the vehicle downward side thereof is further to the vehicle rearward side than the vehicle upward side thereof.

A vehicle upward side end portion of the front side dividing wall 50A is inflected so as to be in surface contact with the curved vehicle forward side wall face 44B of the foot portion 48, and this end portion is joined to the vehicle forward side wall face 44B by spot welding.

Meanwhile, the rear side dividing wall 50B extends orthogonally with respect to the vehicle width direction outer side connecting wall 50D, to the vehicle width direction inner side from an end portion at the vehicle rearward side of the vehicle width direction outer side connecting wall 50D, and the rear side dividing wall 50B is inclined such that, in a vehicle side view, the vehicle downward side thereof is further to the vehicle forward side than the vehicle upward side thereof.

A vehicle upward side end portion of the rear side dividing wall 50B is inflected so as to be in surface contact with the curved vehicle rearward side wall face 44C of the foot portion 48, and this end portion is joined to the vehicle rearward side wall face 44C by spot welding.

The lower side connection dividing wall 50C extends horizontally to the vehicle width direction inner side from the lower end of the vehicle width direction outer side connecting wall 50D.

An end portion at the vehicle width direction inner side of the lower side connection dividing wall 50C forms a flange portion 50Cd that is inflected to the vehicle upward side so as to be in surface contact with the upper flange portion 26a of the rocker inner panel 26. The flange portion 50Cd is joined to a vehicle width direction outer side face of the upper flange portion 26a of the rocker inner panel 26 by spot welding. Thus, the vehicle width direction outer side wall face 44A of the pillar outer 44 is fixedly connected to the rocker inner panel 26.

An end portion at the vehicle forward side of the lower side connection dividing wall 50C forms a flange portion 50Ca that is inflected to the vehicle upward side so as to be in surface contact with the lower end side of the front side dividing wall 50A. The flange portion 50Ca is joined to the front side dividing wall 50A by spot welding.

Meanwhile, an end portion at the vehicle rearward side of the lower side connection dividing wall 50C forms a flange portion 50Cb that is inflected to the vehicle upward side so as to be in surface contact with the lower end side of the rear side dividing wall 50B. The flange portion 50Cb is joined to the rear side dividing wall 50B by spot welding.

Figure 6:
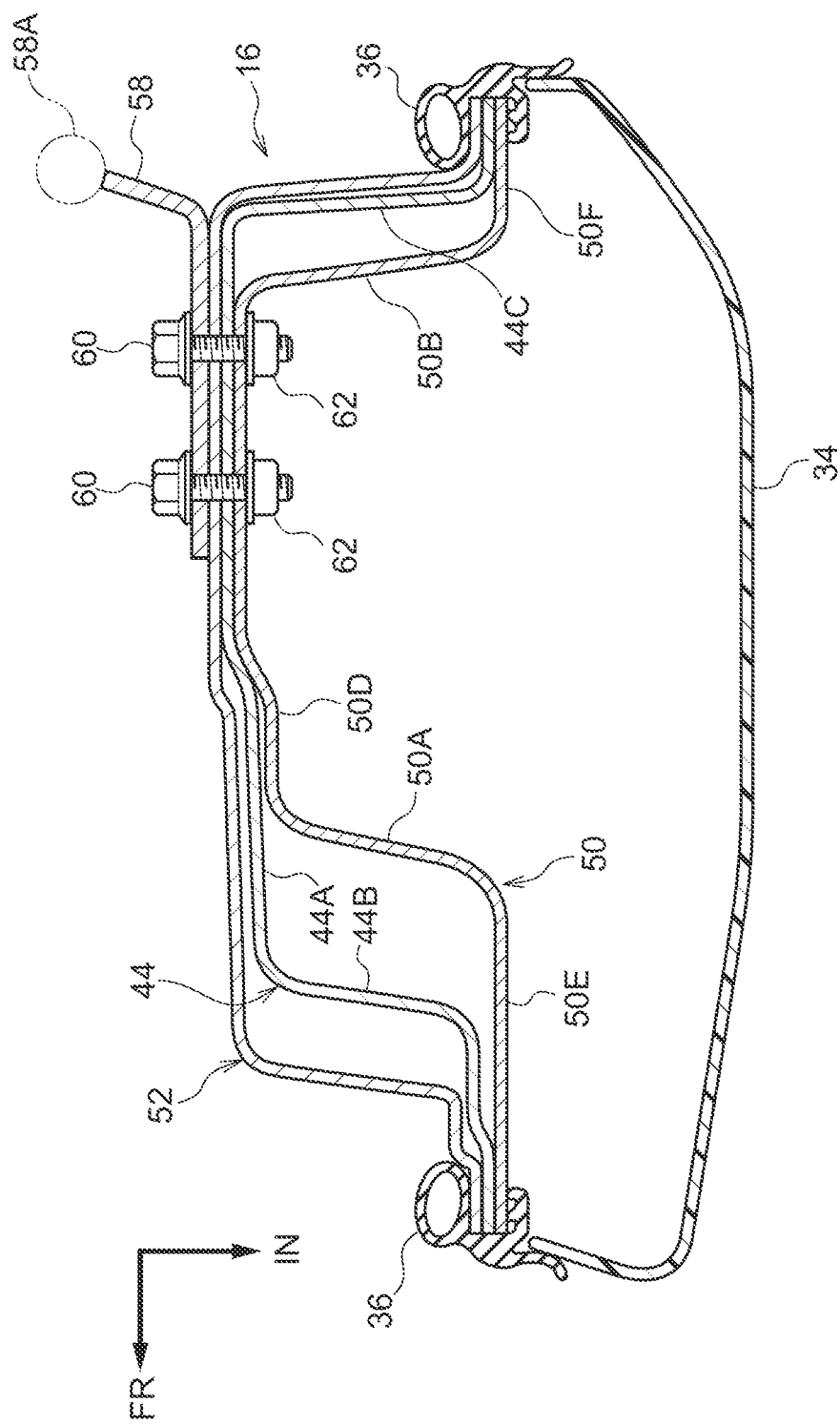
FIG. 6 is a horizontal sectional diagram of a center pillar.

As illustrated in FIG. 1, FIG. 2 and FIG. 6, two welded nuts 62 for fastening bolts 60 in order to attach a door hinge 58, which is described herebelow, are welded to the pillar reinforcement member 50 of the present exemplary embodiment, in the vicinity of the corner portion of the vehicle upward side and vehicle rearward side of the vehicle width direction outer side connecting wall 50D. The reference numeral 58A indicates an axis of the door hinge 58. Hence, a rear side door (not illustrated) is attached to the center pillar 16 via the door hinge 58. This rear side door is disposed at the vehicle rearward side further than the door hinge 58.

As illustrated in FIG. 6, penetration holes through which the bolts 60 penetrate are formed at the side member outer 52, the vehicle width direction outer side wall face 44A of the pillar outer 44, and the vehicle width direction outer side connecting wall 50D of the pillar reinforcement member 50. As illustrated in FIG. 6, a pillar garnish 34 is provided at the vehicle width direction inner side of the pillar outer 44, and weather strips 36 are attached to end portions of the pillar outer 44.

As illustrated in FIG. 1 and FIG. 2, at the vehicle width direction outer side connecting wall 50D of the pillar reinforcement member 50, beads 64 and 66 are formed that extend along the vehicle front-rear direction so as to each span between the front side dividing wall 50A and the rear side dividing wall 50B, at the vehicle upward side of the welded nuts 62—at a vehicle upward side end portion of the vehicle width direction outer side connecting wall 50D in the present exemplary embodiment—and at the vehicle downward side of the welded nuts 62, in order to reinforce the door hinge attachment portion. The beads 64 and 66 of the present exemplary embodiment are provided in order to raise the stiffness of the steel plate. The beads 64 and 66 have semi-circular cross-sectional shapes, but other shapes are possible.

A vehicle side view shape of the triangular front side dividing wall 50E appears as a substantially triangular shape, extending from a vehicle width direction inner side end portion of the front side dividing wall 50A to the vehicle forward side and to the vehicle downward side. A vehicle forward side end portion of the triangular front side dividing wall 50E (a region at the vehicle forward side edge of the triangle) is superposed with a flange portion of the front flange portion 44Bb of the curved foot portion 48 and is joined thereto by spot welding. A vehicle downward side end portion of the triangular front side dividing wall 50E (a region at the vehicle downward side edge of the triangle) is superposed with the vehicle width direction outer side of the upper flange portion 46Aa of the rocker outer 46 and is joined thereto by spot welding.

A vehicle side view shape of the triangular rear side dividing wall 50F appears as a substantially triangular shape, extending from a vehicle width direction inner side end portion of the rear side dividing wall 50B to the vehicle rearward side and to the vehicle downward side. A vehicle rearward side end portion of the triangular rear side dividing wall 50F (a region at the vehicle rearward side edge of the triangle) is superposed with a flange portion of the rear flange portion 44Cc of the curved foot portion 48 and is joined thereto by spot welding. A vehicle downward side end portion of the triangular rear side dividing wall 50F (a region at the vehicle downward side edge of the triangle) is superposed with the vehicle width direction outer side of the upper flange portion 46Aa of the rocker outer 46 and is joined thereto by spot welding.

Thus, the foot portion 48 of the pillar outer 44 is given a closed cross-section that is closed off with the pillar reinforcement member 50 as dividing walls, and the interior space of the pillar is divided up-down by the pillar reinforcement member 50.

—Sealing of Gaps with a Sealing Agent—

In the present exemplary embodiment, in order to block off an interior space of the rocker 24 from a space of the center pillar 16 (the cabin inner side space), a sealing agent 68 is applied so as to close off gaps between the pillar reinforcement member 50 and the pillar outer 44 and gaps between the pillar reinforcement member 50 and the rocker inner panel 26. Thus, water, dust, sound and the like may be completely blocked from ingressing into the interior of the rocker 24 and, via the center pillar 16, to the vehicle cabin inner side.

The sealing agent 68 is applied to the pillar reinforcement member 50, the pillar outer 44, the rocker inner panel 26 and the like from the vehicle inner side.

Figure 7:
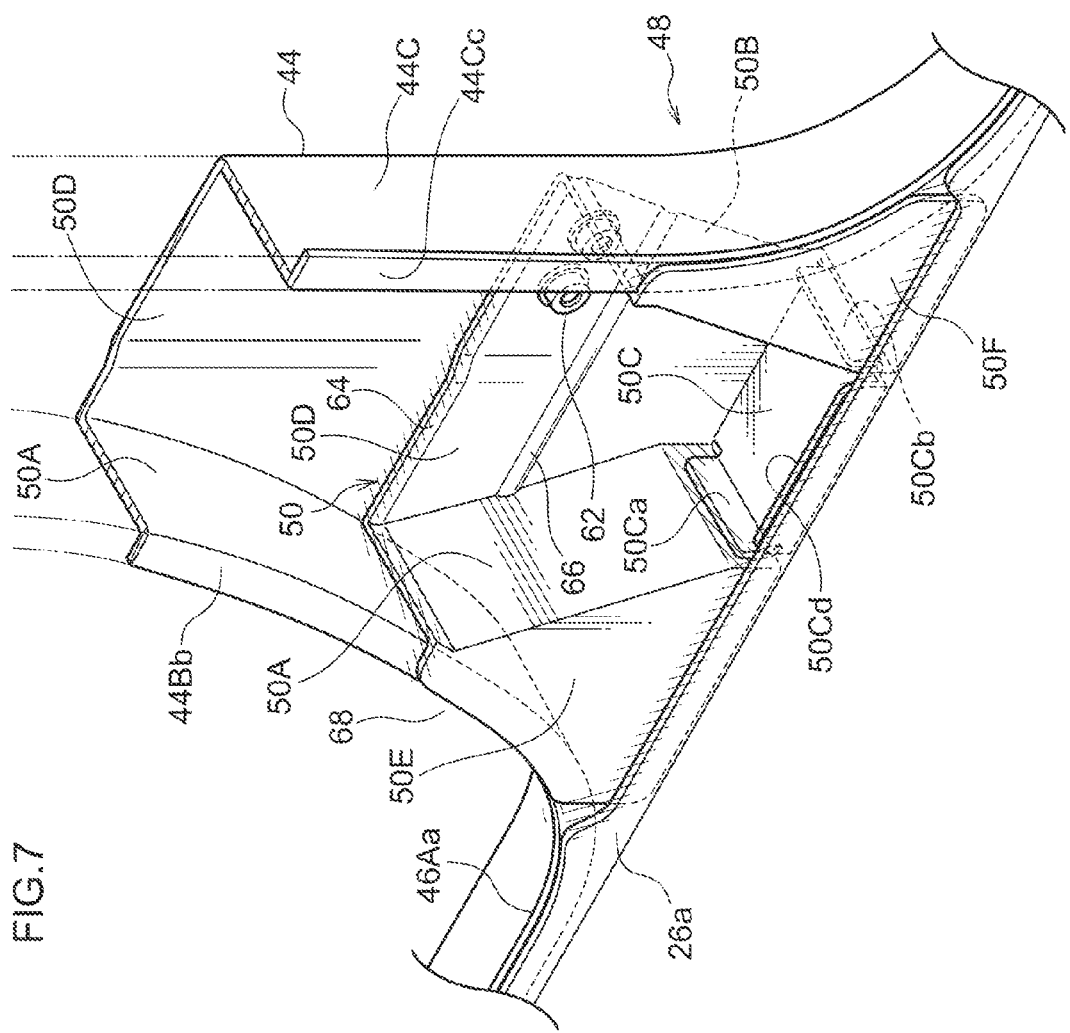
FIG. 7 is a sectional diagram of the vehicle side portion joining portion structure, illustrating a sealing portion.

As illustrated in FIG. 7, in the present exemplary embodiment, regions to which the sealing agent 68 is applied (the shaded regions in the drawing) are the regions described below:

Between the triangular front side dividing wall 50E and the upper end portion of the upper flange portion 26a; between the upper end portion of the front side dividing wall 50A and the vehicle forward side wall face 44B; between the upper end of the vehicle width direction outer side connecting wall 50D and the vehicle width direction outer side wall face 44A; between the upper end portion of the rear side dividing wall 50B and the vehicle rearward side wall face 44C; between the triangular rear side dividing wall 50F and the upper end portion of the upper flange portion 26a; between the upper end portion of the flange portion 50Ca and the front side dividing wall 50A; between the upper end portion of the flange portion 50Cb and the rear side dividing wall 50B; between the upper end portion of the flange portion 50Cd and the upper end portion of the upper flange portion 26a; between a side end portion of the flange portion 50Ca and a side end portion of the flange portion 50Cd; between a side end portion of the flange portion 50Ca and the vehicle width direction outer side connecting wall 50D; between a side end portion of the flange portion 50Cb and a side end portion of the flange portion 50Cd; and between a side end portion of the flange portion 50Cb and the vehicle width direction outer side connecting wall 50D.

The sealing agent 68 may be applied to the above-described gaps between the members from the vehicle inner side. The sealing agent 68 may also be applied between the upper end of the upper flange portion 26*a* of the rocker inner panel 26 and the upper end of the upper flange portion 46Aa of the rocker outer 46.

As illustrated in FIG. 1 and FIG. 2, a floor panel 54 is disposed at the vehicle width direction inner side of the rocker inner panel 26. A flange 54A is formed at a vehicle width direction outer side end portion of the floor panel 54. The flange 54A is joined to the vehicle direction inner side face of the rocker inner panel 26 by spot welding.

As illustrated in FIG. 1, a cross-member 56 is disposed at an upper portion of the floor panel 54. The cross-member 56 is formed in a substantial hat shape in cross section, extending in the vehicle width direction. The cross-member 56 is joined to the floor panel 54 by flanges 56A formed at the lower end side thereof and being spot-welded thereto, and is joined to the vehicle width direction inner side face of the rocker inner panel 26 by flanges 56B formed at the vehicle width direction end side being spot-welded thereto.

Here, the cross-member 56 is disposed at the vehicle width direction inner side of the center pillar 16.

—Operations and Effects—

Next, operations and effects of the above exemplary embodiment are described.

In the vehicle side portion joining portion structure of the present exemplary embodiment, the vehicle forward side of the foot portion 48 is given a closed cross section by the front side dividing wall 50A and triangular front side dividing wall 50E of the pillar reinforcement member 50 being joined to the pillar outer 44, and the vehicle rearward side of the foot portion 48 is given a closed cross section by the rear side dividing wall 50B and triangular rear side dividing wall 50F of the pillar reinforcement member 50 being joined to the pillar outer 44. Thus, cross-sectional crushing of the foot portion 48 when an external force acts on the pillar outer 44 is suppressed. These portions formed with closed cross sections at the vehicle forward side and vehicle rearward side of the foot portion 48 have substantially triangular shapes in a vehicle side view, and may efficiently suppress deformation of the foot portion 48.

Thus, deformations in which the center pillar 16 collapses in the vehicle body front or rear direction or in the vehicle body inner or outer width direction, and vibrations and the like, may be effectively suppressed. Twisting of the center pillar 16 may also be suppressed because the stiffness of the foot portion 48 is improved.

Furthermore, when there is a side impact, an external force acting on the pillar outer 44 is transmitted to the lower side connection dividing wall 50C as well as to the above-described closed cross section regions. Therefore, the external force may be dispersed into the rocker inner panel 26 via the lower side connection dividing wall 50C.

Thus, compared to a case in which the lower side connection dividing wall 50C is not provided, the external force borne at the region of the foot portion 48 with the closed cross sections is moderated and cross-sectional crushing is further suppressed.

When there is a side impact, the load of an impacting vehicle is taken up over a broad area by the vehicle width direction outer side connecting wall 50D of the pillar reinforcement member 50 that is joined to the pillar outer 44. The load taken up by the vehicle width direction outer side connecting wall 50D is supported by the front side dividing wall 50A, the rear side dividing wall 50B and the lower side connection dividing wall 50C, and is also supported by the triangular front side dividing wall 50E and the triangular rear side dividing wall 50F. Therefore, the load may be efficiently transmitted through the rocker inner panel 26 to the platform (the cross-member 56 and the floor panel 54 in the present exemplary embodiment).

Forces (loads) that act on the portion of the center pillar 16 at which the door hinge 58 is attached are mainly (1) an up-down force, (2) a moment force about an axis extending in the vehicle width direction and (3) a moment force about an axis extending in the vehicle front-rear direction. The up-down force (1) and the moment force (2) may be taken up by the above-mentioned high-stiffness closed cross section portion at the vehicle forward side of the foot portion 48, via the high-stiffness beads 64 and 66 provided above and below the welded nuts 62 that are the door hinge attachment portion, and similarly by the high-stiffness closed cross section portion at the vehicle rearward side of the foot portion 48. Thus, the center pillar 16 is assured of high stiffness with respect to the up-down force (1) and the moment force (2). The above-mentioned moment force (3) is transmitted to the high-stiffness rocker 24 by the high-stiffness closed cross section portion at the vehicle forward side of the foot portion 48 and the high-stiffness closed cross section portion at the vehicle rearward side of the foot portion 48. Thus, the door hinge attachment portion of the center pillar 16, that is, the surroundings of the welded nuts 62, is assured of high stiffness with respect to the moment force (3).

Thus, in the vehicle side portion joining portion structure of the present exemplary embodiment, cross-sectional crushing of the foot portion 48 of the pillar outer 44 may be suppressed by the pillar reinforcement member 50. Therefore, if the pillar outer 44 that is a pillar skeleton member is given an open cross section as in the present exemplary embodiment, or if the plate thickness of the pillar outer 44 is reduced in order to reduce weight, or if there is no upper wall 46A of the rocker outer 46 at the joining portion of the rocker outer 46 with the pillar outer 44, or the like, an especially large reinforcement effect may be exhibited.

In the present exemplary embodiment, because the stiffness of the foot portion 48 with the pillar reinforcement member 50 that is formed of a single steel plate is improved, deformations in which the center pillar 16 collapses in the vehicle body front or rear direction or in the vehicle body inner or outer width direction and vibrations and the like may be effectively suppressed while the number of components and the weights of materials used are kept to the minimum.

The vehicle of the present exemplary embodiment employs open cross section structures based on an integrated reinforcement structure and an innerless structure at the pillar portion and the rocker portion, and has a structure in which there is no upper wall 46A inside the pillar joining portion. An input force from a side-impacting vehicle may be transmitted over the shortest distance, and efficiently, through the center pillar 16, the pillar reinforcement member 50 and the rocker 24 to the platform that is the base (the cross-member 56 and the floor panel 54). Thus, deformations in which the center pillar 16 collapses in the vehicle width direction may be suppressed, and an amount by which the pillar enters into the vehicle cabin interior may be reduced.

If the members structuring the center pillar 16 are made thinner in order to reduce weight, deformations of the center pillar 16 collapsing in the vehicle body front or rear direction or in the vehicle body inner or outer width direction, and vibrations, tend to get worse. However, because the pillar reinforcement member 50 is provided at the foot portion 48, deformations of the center pillar 16 collapsing in the vehicle body front or rear direction or in the vehicle body inner or outer width direction and vibrations are effectively suppressed.

The pillar reinforcement member 50 reinforces the rocker 24 and the pillar outer 44 with the front side dividing wall 50A and rear side dividing wall 50B extending diagonally upward from the vehicle front and rear ends of the lower side connection dividing wall 50C joined to the vehicle width direction outer side wall face 44A. Therefore, stiffness with respect to deformations in directions of the center pillar 16 turning about an (imaginary) axis passing along the vehicle front-rear direction in the vicinity of the upper wall of the rocker 24 is improved.

Therefore, when there is a side impact, a side impact load from the pillar outer side may also be taken up by the front side dividing wall 50A and the rear side dividing wall 50B, and the load may be efficiently transmitted to the floor panel 54 and cross-member 56 serving as the platform at the vehicle width direction inner side, while rotary deformations of the center pillar 16 are suppressed.

Other Exemplary Embodiments

The center pillar 16 of the exemplary embodiment described above is an open cross section structure of which the vehicle width direction inner side is opened. However, the present invention is not to be limited thus. A pillar inner may be joined to the vehicle width direction inner side of the pillar outer 44 and the center pillar 16 may have a closed cross section structure. Accordingly, deformations in which the center pillar 16 collapses in the vehicle body front or rear direction or in the vehicle body inner or outer width direction and vibrations may be further suppressed.

In the exemplary embodiment described above, the pillar outer 44 and the rocker outer 46 are integrally formed of a single steel plate, but the present invention is not to be limited thus. The pillar outer 44 and the rocker outer 46 may be formed as respectively separate components, and the pillar outer 44 and rocker outer 46 formed as separate components may be joined together by welding or the like.

In the exemplary embodiment described above, because the pillar outer 44 and the rocker outer 46 are formed of a single steel plate, there is no upper wall 46A of the rocker outer 46 at the region of joining between the pillar outer 44 and the rocker outer 46, but the present invention is not to be limited thus. If the pillar outer 44 and rocker outer 46 are formed as separate components from one another and joined together by welding or the like, a rocker outer 46 that includes the upper wall 46A continuously to the vehicle front and rear, that is, a rocker 24 that has a closed cross section all along the length direction thereof, may be used. Accordingly, stiffness of the region of joining between the pillar outer 44 and the rocker outer 46 may be improved, and deformations in which the center pillar 16 collapses in the vehicle body front or rear direction or in the vehicle body inner or outer width direction, and vibrations, may be further suppressed.

In the exemplary embodiment described above, the beads 64 and 66 are provided above and below the welded nuts 62 that are a door hinge attachment portion. However, as long as the stiffness of a door hinge attachment portion vicinity may be assured, either of the bead 64 and the bead 66 can be provided. Depending on the circumstances, the bead 64 and the bead 66 may be not provided. A number of beads may also be further increased, and beads that extend up and down may be added.

Furthermore, beads may be formed at the pillar reinforcement member 50 at dividing walls other than the vehicle width direction outer side connecting wall 50D.

In the above exemplary embodiment, an example in which the present invention is applied to the center pillar 16 is described. However, the present invention is also applicable to pillars other than the center pillar 16.

The invention claimed is:

1. A vehicle side portion joining portion structure comprising:
   a rocker configured to include
      a rocker outer that is disposed at a lower side of a vehicle side portion and extends in a vehicle front-rear direction and
      a rocker inner that is disposed at a vehicle width direction inner side of the rocker outer and extends in the vehicle front-rear direction;
   a pillar configured to include at least a pillar outer that extends upward at a vehicle body from the rocker outer, the pillar outer including
      a vehicle width direction outer side wall face,
      a vehicle forward side wall face that extends to the vehicle width direction inner side from a vehicle front side end portion of the vehicle width direction outer side wall face, and
      a vehicle rearward side wall face that extends to the vehicle width direction inner side from a vehicle rear side end portion of the vehicle width direction outer side wall face, and the pillar including, at a rocker side thereof, a foot portion at which the vehicle forward side wall face and the vehicle rearward side wall face curve, such that a dimension of the pillar in the vehicle front-rear direction gradually increases toward the rocker; and
   a pillar reinforcement member that is provided at the foot portion and is configured to include
      a first front side dividing wall that extends to the vehicle width direction inner side from the vehicle width direction outer side wall face and is disposed to form a gap at a vehicle rearward side of the vehicle forward side wall face,
      a second front side dividing wall that connects a vehicle width direction inner side end portion of the first front side dividing wall with a vehicle width direction inner side end portion of the vehicle forward side wall face,
      a first rear side dividing wall that extends to the vehicle width direction inner side from the vehicle width direction outer side wall face and is disposed to form a gap at a vehicle forward side of the vehicle rearward side wall face,
      a second rear side dividing wall that connects a vehicle width direction inner side end portion of the first rear side dividing wall with a vehicle width direction inner side end portion of the vehicle rearward side wall face, and
      a lower side connection dividing wall that connects a lower side end portion of the first front side dividing wall with a lower side end portion of the first rear side dividing wall and that connects the vehicle width direction outer side wall face with the rocker,
   wherein, at the foot portion, a front side closed cross section is formed in a cross section at the vehicle forward side by the vehicle width direction outer side wall face, the first front side dividing wall, the second front side dividing wall and the vehicle forward side wall face, and a rear side closed cross section is formed in a cross section at the vehicle rearward side by the vehicle width direction outer side wall face, the first rear side dividing wall, the second rear side dividing wall and the vehicle rearward side wall face, wherein the pillar reinforcement member including a vehicle width direction outer side connecting wall that connects a vehicle width direction outer side end portion of the first front side dividing wall, a vehicle width direction outer side end portion of the first rear side dividing wall and a vehicle width direction outer side end portion of the lower side connection dividing wall with one another, and that is connected with the vehicle width direction outer side wall face, a vehicle upward side end portion of the first front side dividing wall being welded to the vehicle forward side wall face of the foot portion, a vehicle upward side end portion of the first rear side dividing wall being welded to the vehicle rearward side wall face of the foot portion, and the vehicle width direction outer side connecting wall being weld to the vehicle width direction outer side wall face of the foot portion, wherein the pillar reinforcement member is provided only at a vehicle upper side of the foot portion further than the rocker.

2. The vehicle side portion joining portion structure according to claim 1, wherein a door hinge attachment portion for attaching a door hinge is provided at the vehicle width direction outer side connecting wall, and a bead connecting the first front side dividing wall with the first rear side dividing wall is provided at the vehicle width direction outer side connecting wall, at least one of a vehicle upward side and a vehicle downward side of the door hinge attachment portion.

3. The vehicle side portion joining portion structure according to claim 1, wherein the rocker outer and the pillar outer are integrally formed.

4. The vehicle side portion joining portion structure according to claim 1, wherein the pillar is an open cross section structure in which a vehicle width direction inner side of the pillar outer is opened.

5. The vehicle side portion joining portion structure according to claim 4, wherein sealing members are provided that close a gap between an end portion of the pillar reinforcement member and the pillar outer and a gap between the end portion of the pillar reinforcement member and the rocker inner.

* * * * *